April 1, 1958
L. W. PUSEY
2,828,688
APPARATUS FOR PRINTING LABELS
Filed Nov. 4, 1952
2 Sheets-Sheet 1
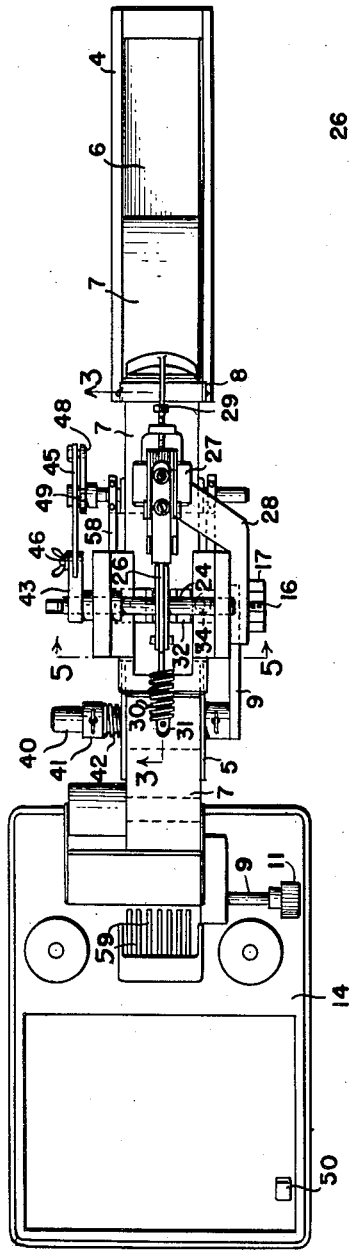
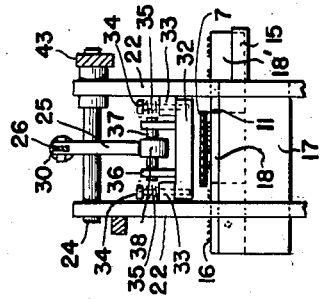
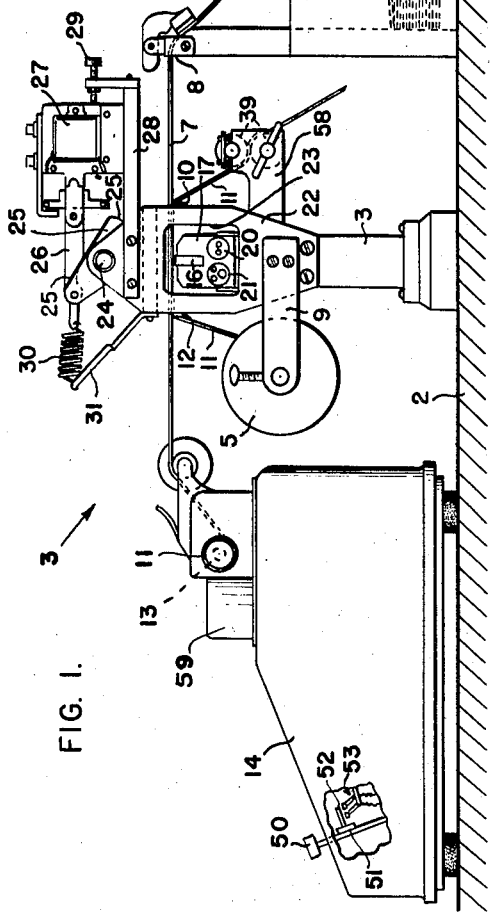
INVENTOR.
LEONARD W. PUSEY
BY
*Brison, Smith & Harding*
ATTORNEYS April 1, 1958  L. W. PUSEY  2,828,688
APPARATUS FOR PRINTING LABELS
Filed Nov. 4, 1952  2 Sheets-Sheet 2
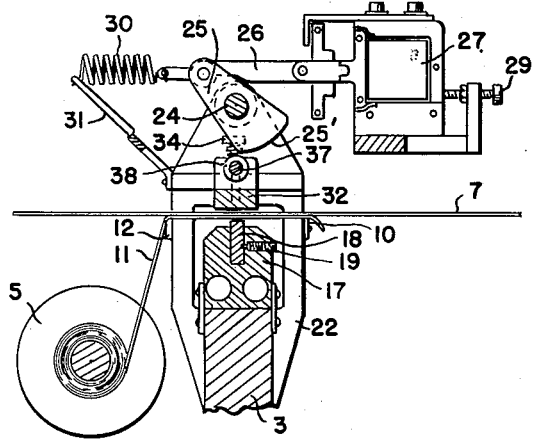
FIG. 3.
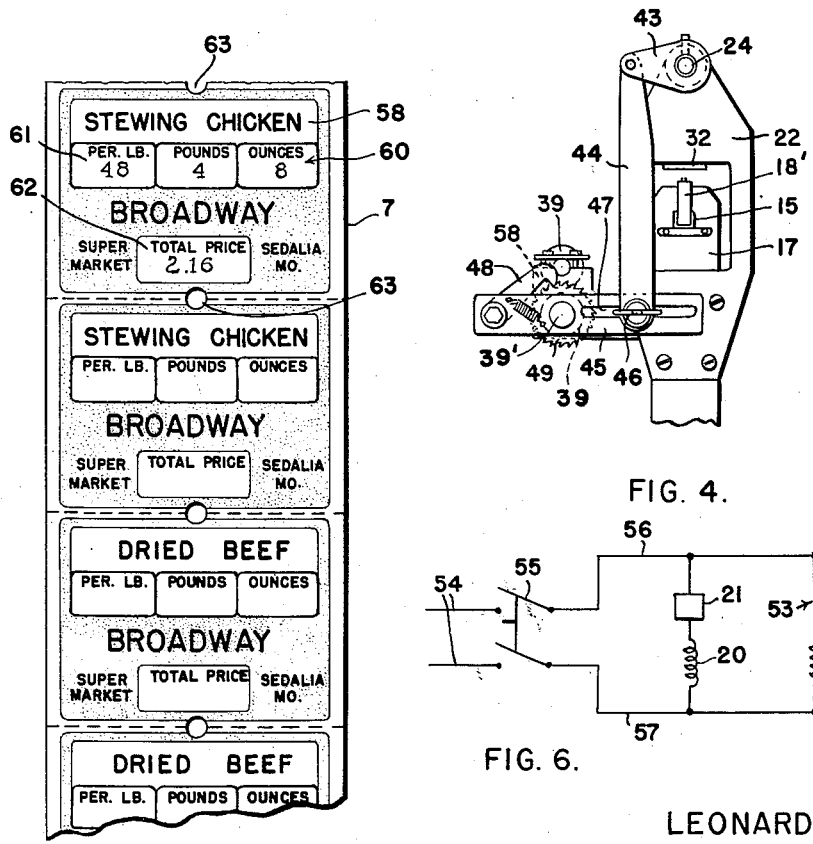
FIG. 4.
FIG. 6.
FIG. 7.
INVENTOR.
LEONARD W. PUSEY
BY
ATTORNEYS

United States Patent Office 2,828,688
Patented Apr. 1, 1958

2,828,688

APPARATUS FOR PRINTING LABELS

Leonard W. Pusey, Philadelphia, Pa., assignor to Globe Ticket Company, Philadelphia, Pa., a corporation of Pennsylvania Application November 4, 1952, Serial No. 318,670

7 Claims. (Cl. 101—93)

This invention relates to apparatus for printing labels while the labels are in strip form and, more particularly, to printing price and identification labels adapted to be applied to packages with the designation of the type of goods contained within the package immediately prior to the application of the label to the package and in conjunction with the printing or marking of the weight and/or price of the package or similar information on the label.

For example, the present practice in merchandizing of food is to have meats and similarly handled foods cut and packaged in a dressing plant and supplied to retail stores for sale in individually weighed and priced packages. Each of these packages must bear a label stating the type of food enclosed within the package, the price of the food per unit of weight, the weight of the food contained within the particular package and the total price of that particular package of food.

It will be evident that a merchandizing concern such as a large food distributing company would require a great number of these labels for application to their various meats and other foods. Heretofore, these labels have been preprinted with designations of the foods sold by the market, for example, stewing chicken, hamburger, dried beef, sharp cheese and the like. It will be evident that, if these labels are preprinted with indications of the type of food to which the labels are to be applied, it is necessary for the market to have a great inventory of different labels. Furthermore, there is the possibility of fraud by virtue of the availability of these labels to numerous employees.

The packaging and labelling of these foods is accomplished in a packing house in which operators weigh each individual package and, by means of suitable calculating or typewriting machines, print on each of the labels designations indicating the type of food involved, the price per pound, the number of pounds and the total price of each particular package and apply a specifically printed label to each package.

It is an object of the present invention to provide apparatus for printing on labels the general designation of the type of goods being packaged and to accomplish this printing in conjunction with the printing of the weight and price or other specific indicia relating to each particular package. The printing apparatus includes a removable printing die by means of which the operator may readily change the designation being applied to a strip of labels being fed to the calculating machine which he is using. Thus it will be necessary for the packer to have only a single supply of labels, the labels being blank in the area adapted to receive the designation of the food to which the label will be ultimately applied, the desired designation being applied by the label printing device to the label immediately prior to the passage of the label through the operator's calculating or other specific indicia printing machine.

For example, an operator may be positioned beside a conveyor belt carrying packaged stewing chickens. The operator will be weighing the packages and applying to stewing chicken labels the weight, the price per pound and the total price of each package, and then applying the labels to the packages. It will be evident that the operator will be able to determine in advance when the last of the stewing chickens is passing along the conveyor belt and that the stewing chickens are followed, for example, by dried beef. When the imprinting apparatus has printed a sufficient number of stewing chicken labels, the operator will replace the stewing chicken printing die in the printing apparatus with a dried beef printing die, and thus, without the necessity of securing other labels or feeding a new strip of labels through the machine, or other interruptions, the operator may immediately proceed to apply weight, unit cost and total price figures to the dried beef labels.

It is a further object of the invention to provide apparatus accommodating the foregoing considerations and providing for printing by the use of a coated tape and a heated die which results in a fine quality of printing.

While throughout this disclosure reference is made to the packaging of foods, it will be evident that the invention may be applied to numerous types of goods such as hardware or any other type of article which requires counting, weighing or other manner of grouping and groups of the articles of a general type packaged and identified by label.

These and other objects of the invention will become apparent from the following description when read in conjunction with the accompanying drawings, in which:

Figure 1 is an elevation of the label printing apparatus showing in conjunction therewith a label strip storage bin and a calculating machine;

Figure 2 is a plan view of the apparatus shown in Figure 1;

Figure 3 is a fragmentary showing of a longitudinal section of the label printing apparatus taken on the trace 3—3 shown in Figure 2;

Figure 4 is a fragmentary rear elevation of the apparatus shown in Figure 1;

Figure 5 is a fragmentary showing of a transverse section of the label printing apparatus taken on the trace 5—5 shown in Figure 2;

Figure 6 is an electrical diagram showing the electrical connections involved in the apparatus; and Figure 7 is a plan view of a label strip showing the indicia imprinted thereon.

As best shown in Figure 1, the invention involves a table 2 on which there is mounted a bin 4 which is adapted to receive a stack 6 of fan-folded labels. These labels are fed as a strip 7 out of the bin 4 over a guide bar 8. The label is fed over guide bars 10 and 12 in an imprinting apparatus indicated generally at 3 in Figure 1 and mounted on the table 2. The labels pass through the inserting apparatus to the platen roller 13 of a calculating machine 14 which is also mounted on the table 2.

The calculating machine 14 may be any one of a number of conventional and well known machines. The platen roller 13 of the calculating machine 14 is of conventional construction and is mounted on a shaft 9 which is provided with a knob 11 by means of which the roller 13 may be manually advanced for advancing the label strip 7 which extends therearound. The calculating machine includes vertically movable printing dies indicated at 59 which serve to print the labels with numerical indicia in response to depression of the keys of the calculating machine.

The calculating machine is provided to permit an operator who, for example, knowing the weight of a package of meat, may print upon the label to be applied thereto the weight of the package in pounds and ounces, as shown generally at 60 in Figure 6, the unit price of the meat in the package, as shown at 61, and the total price of the package, as shown at 62. The desirability of employing a calculating machine which will determine the total price after the operator has set up, on the machine, the unit price and the total weight will be evident. After having printed this information upon a label, the operator will sever the label from the strip as it is fed out of the calculating machine and apply the label to the proper package. The label strip will be desirably provided with indexing holes 63 which are adapted to be engaged by a suitable sprocket feed wheel in the calculating machine in order to properly position the labels in the calculating machine to receive the numerals printed thereon by the machine. The calculating machine 14 may also provide, if desired, the necessary means for recording within itself the weight and value indicia of the various labels which the operator prints thereby. While the calculating machine 14 has been described as possibly performing calculating functions, a conventional adding machine having vertically moving printing dies, such as those indicated at 59, may be employed merely as a typewriting machine. As noted above, in packaging there is generally involved the operation of weighing, though other measuring operations may be involved, and weighing scales are conventionally provided with drums showing the total price for any given unit price per pound and total number of pounds. In this type of operation, where an operator would be positioned beside such a weighing scale, the drum on the weighing scale would accommodate the necessary calculating performing operations and the operator would merely employ the adding machine as a typewriting machine to print on the labels desired specific indicia. Alternatively, the machine 14 could be of the well known type of typewriter in which the paper platen remains stationary and the printing type is variably positioned across the face of the paper.

The label printing apparatus includes a pedestal 3 which is mounted on the table 2 and is adapted to support a printing die holder 17 below the label strip passing over the guide bars 10 and 12. The printing die holder is made of brass or other suitable material having high heat conductivity and is provided with a slot adapted to receive two printing dies 16 and 18 in end to end relation extending transversely of and immediately below the label strip with the printing indicia carried by the die 18 positioned to be engaged by the label strip.

A spring loaded detent 19 is mounted in the die holder and is adapted to cooperate with a depression in the side of the printing die 18 in order to secure the printing die 18 in its proper operating position within the slot within the die holder and under the label strip 7 as will be hereinafter described. Extending from the rear side of the die holder as in Figure 1 or to the right thereof as viewed in Figure 5 is a channel strip 15 which is adapted to receive the dies, such as the die 18', when it is ejected from the rear side of the die holder as a result of the admission of a replacement die into the forward side of the die holder. The printing die holder 17 is also provided with a pair of bores in one of which is inserted a heating element 20 and in the other of which is inserted a thermostat 21.

Attached to each side of the pedestal 3 is an upstanding plate 22. Each of the plates 22 is provided with a cutout 23 to permit access to the printing die holder. A rotatable shaft 24 extends through and between the upper end portions of the plates 22. A cam arm 25 is affixed to the center portion of the shaft 24 between the plates 22. The upper end of the cam arm 25 is pivotally connected to a horizontal arm 26 which is actuated longitudinally by the armature of a solenoid 27. The solenoid 27 is mounted on an extending frame 28 which is affixed to one of the plates 22. The solenoid 27 may be adjustably positioned on the extending frame 28 by means of a screw and lock nut assembly 29. The upper end of the cam arm 25 is urged to the left, as viewed in Figure 1, by a spring 30 which extends between the left hand end of the arm 26 and a member 31 attached to the plates 22.

Attached to the inside surface of each of the plates 22 above the level of the label strip 7 is a mounting bar 33. A movable platen 32 is yieldingly supported from the mounting bars 33 by means of studs 34 which extend through the mounting bars 33 and are slidable therein and are affixed to the platen 32. Springs 35 positioned between the heads of the studs 34 and the mounting bars 33 urge the platen to an uppermost position. Affixed to the platen between the mounting bars 33 is a pair of upstanding plates 36 through which there extends a shaft 37 having mounted in its center portion a roller 38. Upon actuation of the solenoid 27, the arm 26 is drawn to the right, as viewed in Figure 1, and the cam arm 25 is rotated in a clockwise direction whereupon the cam shaped lower end surface 25' of the cam arm 25 engages the roller 38 and moves the platen downwardly against the urging of the springs 35.

A reel 5 is mounted on a shaft 40. The shaft 40 passes through an arm 9 which is supported from the pedestal 3. The reel 5 contains a supply of tape 11 which is passed over the guide bars 12 and 10 below the label strip 7. The tape is coated on its upper surface with a thermoplastic material. This coating is of a type well known in the art which may be either completely pigmented or alternately may include layers of clear thermoplastic material on each side of a layer of pigmented material. The tape 11 is drawn from the reel 5 and over the guide bars 12 and 10 and between a pair of ratchet driven rollers 39 as will be described. The reel mounting shaft 40 is provided with a collar 41 and a spring 42 which is urged against one flange of the reel 5 to restrain rotation of the reel.

Connected to the rear end of the shaft 24 is an arm 43 which is pivotally connected to a downwardly extending arm 44. The downwardly extending arm 44 is pivotally connected to a horizontal arm 45, this pivotal connection being effected by means of a clamp screw 46 by which the lower end of the arm 44 may be pivotally connected to the arm 43 at any desired location within a slot 47 contained within the arm 43. The rollers 39 are mounted on support arms 58 affixed to the pedestal 3. The arm 45 is pivotally mounted to an extending portion 39' of the shaft of the lower roller 39. A pawl 48 is pivotally mounted to the opposite end of the arm 45 and is adapted to engage a ratchet wheel 49 which is affixed to the extended portion 39' of the shaft of the lower roller 39.

The label printing apparatus is preferably operated in conjunction with the key on the calculating machine 14 which will cause the calculating machine to perform its calculation and print the total price on a label. Such a key is shown at 50 and has affixed to its key stem by means of an insulating mounting bar 51 a contact arm 52 which is adapted to engage the contacts shown generally at 53 when the key 50 is depressed by an operator. When the operator releases the key, the key will be returned to the position shown in Figure 1 by conventional key return means contained within the calculating machine 14 and the contacts will open. When the calculating or adding machine is used merely as a typewriter, the key 50 may be disabled from performing its calculation initiating operation or, alternatively, some other key may be employed. Such other key could be another key of the machine or a specially provided key mounted with contacts such as shown in Figure 1 for accomplishing the printing apparatus initiating operation.

Figure 6 shows a wiring diagram in which electrical power is supplied from power lines 54 through a cutout switch 55 to local supply lines 56 and 57. The printing die heating coil 20 and the thermostatic control therefor 21 have been referred to in the foregoing description. These two elements are connected in series across the local supply lines 56 and 57. The thermostat 21 may be any one of a number of well known thermostats and will be selected to properly control the temperature of the printing die. If desired, the thermostatic control 21 may be replaced by a second heating coil or simply omitted and the single heating coil 20 be continuously energized.

The contact arm 52, shown in Figure 1, is also shown in the wiring diagram of Figure 5 and is connected in series with the coil 27' of the solenoid 27 across the power supply lines 56 and 57. Thus each time the key 50 is depressed by the operator, the solenoid 27 is operated.

Operation of the solenoid 27 moves the horizontal arm 26 to the right, as viewed in Figure 1, rotates the cam arm 25 in a clockwise direction causing the cam shaped lower end surface of the arm 25 to depress the platen 32 and to thereby force the label strip 7 and the plastic coated tape 11 which passes therebelow downwardly upon the heated printing die 18. The tape is normally held in a position just clearing the printing die by the guide bars 10 and 12 as is conventional in this type of coated tape printing. When the tape 11 is heated, the thermoplastic coating thereon is softened and, because of the fact that the temperature of the thermoplastic coating adjacent to the strip 11 is greater than the temperature of the coating adjacent to the ticket strip 7 when the platen 32 is raised, the thermoplastic coating will adhere to the ticket strip 7 over an area corresponding to the indicia carried by the printing die. If, for example, the printing die carries the words "stewing chicken," this operation will cause the words "stewing chicken" to be imprinted upon the label strip as shown at 58 in Figure 6.

Operation of the solenoid 27 will rotate the shaft 24, as shown in Figure 4, in a counterclockwise direction, moving the arm 44 downwardly and moving the left hand end of the arm 45 upwardly, thus causing the ratchet lever 48 to slide over the ratchet teeth on the ratchet wheel 49. When the solenoid 27 is deenergized as a result of the key 50 returning upwardly to its normal position, the spring 30 will cause the shaft 24 to rotate in a counterclockwise direction, as viewed in Figure 3, permitting the platen 32 to be lifted clear of the strip 7 and the printing die 18, and simultaneously moving the vertical arm 44 upwardly, as viewed in Figure 4, thereby causing the ratchet lever 48 to move the ratchet wheel 49 in a counterclockwise direction. This motion of the ratchet wheel 49 will advance the plastic coated tape 11 for a distance depending upon the adjustment of the adjustable pivot 46 in the slot 47 in the arm 45. This adjustment is provided in order that the plastic coated tape may be moved only sufficiently to bring a fresh portion of tape above the printing die. Thus the apparatus may be adjusted for various sizes of type as may be employed on the printing die.

While many of the labels employed in this type of apparatus employ a thermoplistic adhesive on the back of a label in order that the label may be applied to the food package, the thermoplastic transfer material which is provided on the transfer tape may be of such a type as to require a printing temperature sufficiently low so as not to soften the thermoplastic adhesive to thereby prevent adherence of the labels to the platen.

The printing die holder 17 is of sufficient length that it will carry the printing die 18 which is held in operating position beneath the two tapes by the detent 19 and also a second printing die 16 which is positioned adjacent to the tape in an inoperative position. The operator packaging the foods will be able to determine well in advance of the time of changeover the type of the next food which he is to package. If, for example, he is packaging stewing chicken and the next food which he will package is dried beef, he will place a dried beef printing die in the inoperative position in the printing die holder. Thus the dried beef printing die will become heated while in the inoperative position.

Inasmuch as there is a predetermined distance between the printing die and the calculating machine, there will be a predetermined number of labels between the printing die and the calculating machine. It is possible, therefore, for the operator to insert the heated dried beef die into printing position, thereby ejecting the stewing chicken die, when there remains for the operator to packaging a number of stewing chicken packages equal to the number of labels between the printing apparatus and the calculating machine. Thus as the operator prints the necessary indicia upon the remaining stewing chicken labels and those labels are passed through the calculating machine, the printing apparatus will be printing dried beef labels in anticipation of the operator's future needs.

While the disclosure has been made with reference to a calculating machine, it will be evident that a printing weighing machine or other type of machine for marking specific designations on the labels may be substituted for the calculating machine depending upon the type of goods involved and the desired specific designations to be applied to each label.

By this process there are printed no unnecessary labels and, in place of a stock of a great many different types of labels, it is necessary that there be a stock of only one type of label and each operator may have positioned conveniently to his printing machine a supply of label printing dies which may be conveniently stored in a small amount of space.

It will be evident that, by means of this label printing apparatus, the goods packager may not only greatly reduce his inventory of labels, but he may also greatly facilitate the labelling of his various packages in that, instead of requiring an operator to obtain labels from a label storage location and rethread a label strip into a calculating, typewriting, weighing or other marking machine with each change of goods to be labelled, by means of the present invention, it is merely necessary for the operator to change the label printing die as previously described to change the type of label produced.

Furthermore, if the machine 14 is of a commonly employed type producing an accounting record as noted above fraud is prevented in that the labels are accounted for in the machine 14 in the preferred arrangement of the system, so that extra labels could not be printed, without detection, for later possible substitution by a purchaser, collaborating with the printer of the labels, for a label indicating a higher price for the packaged goods. The accounting also serves as a check on receipts from sales of the goods.

What is claimed is:

1. Apparatus for printing labels adapted to be applied to packages with indicia relating to the goods contained within each package, said apparatus comprising means for storing a plurality of labels in strip form, mechanism including means through which the strip of labels is fed for applying an individual specific designation to each of the successive labels and means for advancing the strip, and means spaced from said mechanism through which the strip passes prior to its entry into said mechanism and operative in response to operation of said mechanism for applying a common designation to each of the successive labels in the strip prior to their entry into said mechanism, said mechanism being spaced from said common designation printing means by a distance greater than the length of one label in the strip and printing each label subsequent to the printing thereon by the common designation printing means.

2. Apparatus for printing labels adapted to be applied to packages with indicia relating to the goods contained within each package, said apparatus comprising means for storing a plurality of labels in strip form, a separate typewriting machine through which the strip of labels is fed for printing an individual specific designation to each of the successive labels and for advancing the strip, separate electrically operated printing means positioned between said storing means and said typewriting machine, and electrical means actuated by operation of said typewriting machine for actuating said printing means to print a common designation to each of the successive labels in the strip prior to their entry into said typewriting machine.

3. The method of labeling articles comprising delivering a succession of articles of the same general class to a measuring station, preprinting a strip of labels providing on each label of the strip an area for the reception of general indicia and an area for the reception of specific indicia, successively measuring the articles delivered, applying the successive measurements of the successive articles to the specific indicia reception area of the successive labels, applying general indicia relating to the general class of the articles to each successive label in the strip at the time of application of specific indicia to a preceding label in the strip, and labeling the articles with their corresponding indicia bearing labels.

4. The method of labeling articles comprising delivering a succession of articles of the same general class to a measuring station, preprinting a strip of labels providing on each label of the strip an area for the reception of general indicia and an area for the reception of specific indicia, successively measuring the articles delivered, applying the measurement of each article to the specific indicia reception area of each label at the time of measuring each article, applying general indicia relating to the general class of the articles to each successive label in the strip at the time of application of specific indicia to a preceding label in the strip, and labeling the articles with their corresponding indicia bearing labels.

5. The method of labeling successive groups of different classes of articles comprising delivering in succession the articles of each successive group to a measuring station, preprinting a strip of labels providing on each label of the strip an area for the reception of general indicia and an area for the reception of specific indicia, successively measuring the articles delivered, applying the measurement of each article to the specific indicia reception area of each label at the time of measuring each article, applying general indicia relating to the general class of the articles being labeled to each successive label in the strip at the time of application of specific indicia to a preceding label in the strip, labeling the articles with their corresponding indicia bearing labels, and printing the general indicia relating to the next successive class of articles on the labels in the strip at such time prior to the printing of specific indicia thereon as to provide properly indicating labels for the reception of specific indicia and for application to the last article of one group and to the first article of the next group.

6. Apparatus for printing labels adapted to be applied to packages with indicia relating to the goods contained within each package, said apparatus comprising means for storing a plurality of labels in strip form, a separate printing machine through which the strip of labels is fed for printing an individual specific designation to each of the successive labels and for advancing the strip, separate electrically operated printing means positioned between said storing means and said printing machine, and electrical means actuated by operation of said printing machine for actuating said printing means to print a common designation to each of the successive labels in the strip prior to their entry into said printing machine.

7. The method of labeling articles comprising delivering a succession of articles of the same general class to a measuring station, successively measuring the articles delivered, applying the successive measurements of the successive articles to specific indicia reception areas of successive label areas of a strip of label material, applying general indicia relating to the general class of the articles to each successive label area in the strip at the time of application of specific indicia to a preceding label in the strip, and labeling the articles with their corresponding indicia bearing labels.

References Cited in the file of this patent

UNITED STATES PATENTS

| | | |
|---|---|---|
| 214,541 | Windrath | Apr. 22, 1879 |
| 762,609 | Belknap | June 14, 1904 |
| 925,923 | Kutz | June 22, 1909 |
| 1,290,509 | Chandler | Jan. 7, 1919 |
| 1,468,185 | Weckbaugh | Sept. 18, 1923 |
| 1,726,541 | Cole | Sept. 3, 1929 |
| 1,730,984 | Swann | Oct. 8, 1929 |
| 1,817,399 | Sherman | Aug. 4, 1931 |
| 1,884,189 | Perkins | Oct. 25, 1932 |
| 1,916,985 | Ogsbury | July 4, 1933 |
| 1,988,904 | Krell | Jan. 22, 1935 |
| 2,065,690 | Gould | Dec. 29, 1936 |
| 2,238,517 | Colley | Apr. 15, 1941 |
| 2,286,458 | Bowman | June 16, 1942 |
| 2,301,198 | Brenn | Nov. 10, 1942 |
| 2,694,361 | Jacobson | Nov. 16, 1954 |